US012096196B2

(12) United States Patent
Ilkorur et al.

(10) Patent No.: US 12,096,196 B2
(45) Date of Patent: *Sep. 17, 2024

(54) MOVING-MAGNET MOTOR

(71) Applicant: Apple Inc., Cupertino, CA (US)

(72) Inventors: Onur I. Ilkorur, Redwood City, CA (US); Oliver Leonhardt, San Francisco, CA (US); Matthew A. Donarski, San Francisco, CA (US); Christopher Wilk, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,802

(22) Filed: Oct. 17, 2023

(65) Prior Publication Data

US 2024/0064467 A1 Feb. 22, 2024

Related U.S. Application Data

(63) Continuation of application No. 17/688,536, filed on Mar. 7, 2022, now Pat. No. 11,812,248.

(60) Provisional application No. 63/174,942, filed on Apr. 14, 2021.

(51) Int. Cl.
| | |
|---|---|
| *H04R 9/02* | (2006.01) |
| *H04R 1/02* | (2006.01) |
| *H04R 7/04* | (2006.01) |
| *H04R 9/04* | (2006.01) |
| *H04R 9/06* | (2006.01) |
| *H04M 1/62* | (2006.01) |

(52) U.S. Cl.
CPC ............. *H04R 9/025* (2013.01); *H04R 1/025* (2013.01); *H04R 7/04* (2013.01); *H04R 9/046* (2013.01); *H04R 9/06* (2013.01); *H04M 1/62* (2013.01); *H04R 2400/11* (2013.01); *H04R 2499/11* (2013.01)

(58) Field of Classification Search
CPC .......... H04R 9/025; H04R 1/025; H04R 7/04; H04R 9/046; H04R 9/06; H04R 2400/11; H04R 2499/11; H04M 1/62
USPC ....................................................... 381/334
See application file for complete search history.

(56) References Cited

U.S. PATENT DOCUMENTS

| | | |
|---|---|---|
| 5,134,326 A | 7/1992 | Sakamoto |
| 6,269,168 B1 | 7/2001 | Tagami |
| 8,811,648 B2 | 8/2014 | Pance et al. |
| 8,891,809 B2 | 11/2014 | Danovi |
| 9,258,648 B2 | 2/2016 | Lucas et al. |
| 9,763,013 B2 | 9/2017 | Lucas et al. |
| 10,863,094 B2 | 12/2020 | Sharma et al. |
| 2004/0136558 A1* | 7/2004 | Usuki .................... H04R 9/025 381/394 |

* cited by examiner

*Primary Examiner* — Sean H Nguyen
(74) *Attorney, Agent, or Firm* — Aikin & Gallant, LLP

(57) ABSTRACT

A moving magnet motor comprising: a stationary voice coil coupled to a frame; a moving magnet assembly movably coupled to the frame and operable to move relative to the stationary coil, the moving magnet assembly comprising a magnet and a flux concentrating member that define a gap within which the stationary coil is positioned; and an actuating surface coupled to the moving magnet assembly, and wherein a movement of the moving magnet assembly drives a movement of the actuating surface along an axis of translation.

20 Claims, 9 Drawing Sheets

MOVING-MAGNET MOTOR

CROSS-REFERENCE TO RELATED APPLICATION

This application is a continuation of co-pending U.S. patent application Ser. No. 17/688,536, filed Mar. 7, 2023, which claims the benefit of priority of U.S. Provisional Patent Application No. 63/174,942, filed Apr. 14, 2021 and incorporated herein by reference.

FIELD

An aspect of the disclosure is directed to a moving-magnet motor including a moving-magnet motor having a magnet assembly that moves relative to a coil to focus the magnetic field over the coil and reduce a reverse magnetic field effect. Other aspects are also described and claimed.

BACKGROUND

In modern consumer electronics, audio capability is playing an increasingly larger role as improvements in digital audio signal processing and audio content delivery continue to happen. In this aspect, there is a wide range of consumer electronics devices that can benefit from improved audio performance. For instance, portable devices that use electrodynamic transducers having moving motor systems can benefit from improved performance. For example, while moving motor systems may have the advantage of using a larger coil than non-moving motor systems, they may be less efficient because they use an open magnetic circuit around the magnet without a region of focused magnetic field. This in turn, results in a reverse magnetic flux passing through the same coil that is developing the Lorentz force to excite the diaphragm. At large excursions, there becomes no dominant flux density over the coils, which introduces distortion as the positive and negative Lorentz forces almost cancel each other out.

SUMMARY

An aspect of the disclosure is directed to an improvement over moving magnet motors, for example loudspeaker motors. Typically, moving magnet speakers are designed using the stray magnetic flux density of magnets to move the motor, which are not a part of a closed magnet circuit. When magnets are used outside magnetic circuits, their ability of focusing their magnetic flux density is very poor. The working point of a magnet in free space is very low, therefore the magnet is also not protected from demagnetization under elevated temperatures. Therefore, when loudspeakers are built with moving magnets that do not use any guiding elements for their magnetic flux, the reverse magnetic flux also passes through the same coil that is developing the Lorentz force to excite the diaphragm. At large excursions, there becomes no dominant flux density over the coils, which introduces distortion as the positive and negative Lorenz forces almost cancel out each other.

The instant disclosure therefore provides a moving magnet motor having a closed magnet circuit configured to focus a magnetic flux density on the coil and travel over the coil driving the movement of the actuating surface (e.g., a speaker diaphragm). This configuration results in a reverse magnetic field that becomes very small as compared to the dominant flux density on the coil such that large excursion and low distortion values can be achieved. To accomplish this, one or more radially polarized magnet(s) are positioned close to the voice coil(s) (e.g., inner and outer coils having the same winding height), and the magnetic flux lines of the magnet are concentrated with one or more flux concentrating member(s) made of soft magnetic material(s) (e.g., a steel material) positioned along the other side of the voice coil(s). The polarized magnet(s) and the soft magnetic material(s) are part of the same moving mass therefore the soft magnetic material follows the motion of the magnet. This moving mass is, in turn, connected to the actuating surface (e.g., speaker diaphragm) such that its movement drives the movement (e.g., vibration) of the actuating surface. Since the highest concentration of flux density occurs between the soft magnetic material(s) and the magnet(s), the dominant magnetic flux density moves with the moving assembly, without much degradation depending on the position of the diaphragm. This dominant flux density region, moving over the voice coil(s), enables larger excursion of the actuating surface (e.g., diaphragm), without observing reverse magnetic field disturbance. This is because the reverse magnetic field magnitude becomes extremely small when compared to the dominant magnetic flux density between the hard and soft magnetic parts. Accordingly, a moving magnet motor system for driving an actuating surface with large excursion and low distortion values can be achieved.

Representatively, in one aspect, a moving magnet motor including a stationary voice coil coupled to a frame; a moving magnet assembly movably coupled to the frame and operable to move relative to the stationary coil, the moving magnet assembly comprising a magnet and a flux concentrating member that define a gap within which the stationary coil is positioned; and an actuating surface coupled to the moving magnet assembly, and wherein a movement of the moving magnet assembly drives a movement of the actuating surface along an axis of translation is provided. The stationary coil may be a continuous voice coil. The stationary coil may be an annularly shaped voice coil and the magnet is radially inward of the voice coil and the flux concentrating member is radially outward of the voice coil. In other aspects, the flux concentrating member may be radially inward of the voice coil and the magnet is radially outward of the voice coil. The magnet may be a radially polarized magnet. The flux concentrating member may be a steel structure. In other aspects, the flux concentrating member may be a radially polarized magnet. In some aspects, the flux concentrating member is a first flux concentrating member and the moving magnet assembly further comprises a second flux concentrating member that is directly coupled to the magnet. In still further aspects, the stationary coil is a first stationary voice coil, and the assembly further includes a second stationary voice coil positioned radially outward of the first stationary voice coil. In some aspects, the first stationary voice coil and the second stationary voice coil have a same direction of current and a same orientation. In some aspects, the flux concentrating member is positioned between the first and second stationary voice coils, and the magnet is a first radially polarized magnet, the moving magnet assembly further comprises a second radially polarized magnet, and wherein the first radially polarized magnet is positioned radially inward of the first stationary voice coil and the second radially polarized magnet is positioned radially outward of the second stationary voice coil. In other aspects, the magnet is positioned between the first and second stationary voice coils, the flux concentrating member is a first flux concentrating member, the moving magnet assembly further comprises a second flux concentrating member, and wherein the first flux concentrating member is positioned radially inward of the first stationary voice coil and the second flux concentrating member is positioned radially outward of the second stationary voice coil.

In another aspects, a loudspeaker magnet motor assembly including a stationary portion comprising a continuous voice coil fixedly coupled to a frame; and a moving portion comprising a diaphragm and a magnet assembly movably coupled to the frame, the magnet assembly having a first magnet member and a second magnet member operable to focus a magnetic flux density toward the continuous voice coil and translate along the continuous voice coil to drive a movement of the diaphragm along an axis of translation is provided. The magnet assembly may have a displacement range along the axis of translation that is defined by a height of the continuous voice coil. In some aspects, the first magnet member is a radially polarized magnet and the second magnet member is a steel member that are positioned on opposite sides of the continuous voice coil. In some aspects, the first magnetic member and the second magnetic member define a gap within which the continuous voice coil is positioned. In some aspects, the moving portion further comprises a third magnet member directly attached to the first magnet member or the second magnet member. In still further aspects, the continuous voice coil is a first continuous voice coil, and the stationary portion further comprises a second continuous voice coil. In some aspects, the second magnet member may be a steel structure positioned between the first continuous voice coil and the second continuous voice coil, the moving portion further comprises a third magnet member, and wherein the first magnet member and the third magnet member are positioned along sides of the first continuous voice coil and the second continuous voice coil opposite the second magnet member. The moving portion may further include a third magnet member, and the first magnet member, the second magnet member and the third magnet member are radially polarized magnets positioned along different sides of the first continuous voice coil and the second continuous voice coil. In still further aspects, the first magnet member is a radially polarized magnet positioned between the first continuous voice coil and the second continuous voice coil, the moving portion further comprises a third magnet member, and wherein the second magnet member and the third magnet member are steel structures positioned along different sides of the first continuous voice coil and the second continuous voice coil.

In another aspect, an electronic device includes an electronic device housing, a moving magnet motor coupled to the electronic device housing and an actuating surface. The moving magnet motor may include a stationary voice coil and a moving magnet assembly operable to move relative to the stationary coil. The moving magnet assembly may include a magnet and a flux concentrating member that define a gap within which the stationary coil is positioned. In some aspects, the moving magnet motor is a loudspeaker moving magnet motor and the actuating surface is a loudspeaker diaphragm. In some aspects, the actuating surface is a housing wall of the electronic device housing.

In some aspects, the moving magnet motor of any of the previously discussed configurations may be a loudspeaker moving magnet motor or a shaker integrated within a portable electronic device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described in the aspects are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
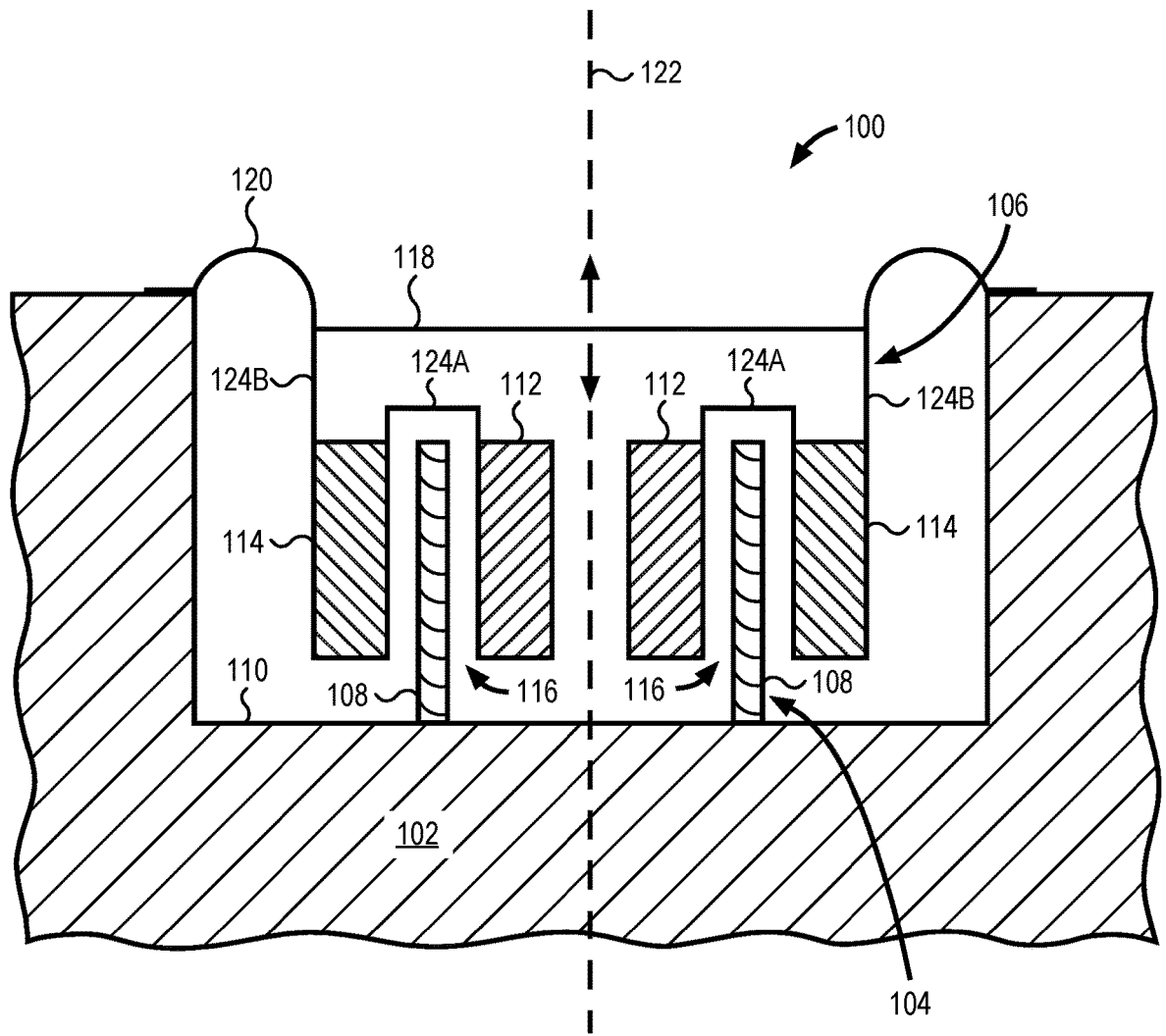
FIG. 1 illustrates a cross-sectional side view of one aspect of a moving magnet motor assembly.

FIG. 1 illustrates a cross-sectional view of a moving magnet motor assembly. In one aspect, assembly 100 may be, for example, a moving magnet motor integrated within an electro-dynamic or electro-acoustic transducer that converts electrical signals into vibrations and/or audible signals that can be output from a device within which assembly 100 is integrated. For example, assembly 100 may be a loudspeaker moving magnet motor. In another aspect, assembly 100 may be a shaker used to actuate or vibrate any type of surface or structure coupled thereto, to provide, for example, a haptic output. For example, assembly 100 may be a loudspeaker and/or shaker integrated within a smart phone, or other similar portable electronic device. In some cases, assembly 100 may be attached to a surface of the device to actuate (e.g., vibrate) the surface. Assembly 100 may be enclosed within a housing or enclosure of the device within which it is integrated.

Assembly 100 may generally include a frame 102, a stationary portion 104 and a moving portion 106 that moves relative to the stationary portion 104 and frame 102. The frame 102 may be any type of support structure that can support components of the assembly and be used to integrate the assembly within a surrounding device (e.g., a portable electronic device). In some aspects, frame 102 may be part of the housing of the device within which assembly 100 is integrated. Stationary portion 104 may, in one aspect, include one or more coil(s) 108 fixedly connected to the frame 102. The one or more coil(s) 108 may, for example, be a voice coil formed by a copper wire winding. The voice coil 108 may be mounted at one end to a bottom wall or side 110 of frame 102. In this aspect, the voice coil may have a winding height that runs vertically, or parallel to the z-height of assembly 100, as shown. The other end (e.g., a top end) of the coil 108 may be free and not directly attached to any other structure or component of the assembly 100. During operation, the coil 108 may be energized by an electric current in a desired direction and used to drive a movement of the moving portion 106.

The moving portion 106 may include a first magnet member 112 and a second magnet member 114 that together define a gap 116 within which the coil 108 is positioned. The first magnet member 112 and the second magnet member 114 may form a closed magnetic circuit that focuses the magnetic flux density toward coil 108. In this aspect, upon application of an electric current to coil 108, the coil reacts to the magnetic field from the closed magnetic circuit causing the first magnet member 112 and the second magnet member 114 to move or translate along an axis of translation 122, as illustrated by the arrows. The axis of translation 122 may, for example, be parallel to the z-axis of assembly 100. In some aspects, the axis of translation 122 may be considered running in an axial direction and may define an axis of symmetry of assembly 100. In still further aspects, the axis of translation 122 may be considered parallel to, or running in the same direction as, the winding height of coil 108 or a height of the gap 116 defined by the first and second magnet members 112, 114. The first magnet member 112 and second magnet member 114 are, in turn, connected to an actuating surface 118 that is coupled to the frame 102 by a suspension member 120. Since the first magnet member 112 and the second magnet member 114 are part of the same moving mass, the first magnet member 112 and the second magnet member 114 move together and drive a movement of the actuating surface 118 along the axis of translation 122. Since the highest concentration of flux density occurs between the first magnet member 112 and the second magnet member 114, the dominant magnetic flux density moves with the moving mass, without much degradation depending on the position of the actuating surface 118 coupled thereto. This dominant flux density region, moving over the coil 108 allows for a larger excursion of the actuating surface 118 (e.g., diaphragm), without observing reverse magnetic field disturbance as previously discussed. Accordingly, assembly 100 achieves a moving magnet motor system that drives an actuating surface with large excursion and low distortion values.

Referring now in more detail to the first magnet member 112 and the second magnet member 114, in some aspects, at least one of the first magnet member 112 and/or the second magnet member 114 may be a polarized magnet. The polarized magnet may be a radially polarized magnet that is orientated within the assembly such that the North and South poles are arranged radially relative to axis of translation 122. In other words, facing the left or right side as viewed in FIG. 1. In still further aspects, one of the first magnet member 112 or the second magnet member 114 may be a flux concentrating member or structure operable to focus the magnetic flux lines of the polarized magnet (e.g., magnet member 112 or 114). Representatively, one of the first magnet member 112 or the second magnet member 114 may be a soft magnetic material such as a steel material that is operable to focus the magnetic flux lines. For example, in one aspect, the first magnet member 112 may be a radially polarized permanent magnet and the second magnet member 114 may be a non-polarized steel member that moves with the first magnet member 112 along the coil 108 to focus the magnetic flux lines toward the coil 108. In another aspect, the second magnet member 114 may be a radially polarized magnet and the first magnet member 112 may be a non-polarized steel member. In still further aspects, both the first magnet member 112 and the second magnet member 114 may be radially polarized magnets that move along the coil 108 to focus the magnetic flux lines. In all cases, however, at least one of the first magnet member 112 or second magnet member 114 should be a radially polarized magnet positioned along one side of coil 108 and the other of the first magnet member 112 or the second magnet member 114 should be a structure which can concentrate the magnetic flux lines toward the coil 108 (e.g. a radially polarized magnet or a soft magnetic material such as steel).

Referring now in more detail to actuating surface 118, actuating surface 118 may be, for example, a sound radiating surface such as a loud speaker diaphragm that is caused to vibrate by the magnet members 112, 114, and outputs sound. In other aspects, actuating surface 118 may be any type of surface where a movement or vibration is desired. For example, in other aspects, the actuating surface 118 may be a wall of a housing or enclosure, such as the enclosure of a device within which assembly 100 is integrated, or another surface or structure that can be used to create, for example, a haptic output felt by the user. The suspension member 120 may be a relatively compliant structure that is strong enough to suspend the first magnet 112, second magnet member 114 and actuating surface 118 from frame 102, while also allowing each of these components to move relative to coil 108 and frame 102. For example, the first magnet member 112 and the second magnet member 114 may be attached to one another by a connecting member 124A (e.g., a bracket, fastener, or the like), and the actuating surface 118 and/or the suspension member 120 may connected to the first or second member 112, 114 by another connecting member 124B (e.g., a bracket, fastener or the like).

In addition, although an assembly including a single coil 108, first magnet member 112 and second magnet member 114 are shown, any number of coils and/or magnet members are contemplated. For example, assembly 100 may include a pair of coils 108, a pair of first magnet members 112 and/or a pair of second magnet members 114. In addition, it is contemplated that the coil 108, first magnet member 112 and second magnet member 114 may be annularly shaped components. For example, coil 108, magnet member 112 and magnet member 114 may have a circular, elliptical or racetrack like shape. In this aspect, first magnet member 112 may be considered an inner magnet member 112 surrounded by coil 108 and second magnet member 114 may be considered an outer magnet member that surrounds coil 108. Said another way, first magnet member 112 may be considered radially inward to coil 108, coil 108 may be radially inward to second magnet member 114 and second magnet member 114 may be radially outward to coil 108.

Various magnet member/coil configurations for assembly 100 will now be described in more detail in reference to FIGS. 2-11. FIGS. 2-11 illustrate cross-sectional side views of a right hand side of various assembly configurations. It should be understood that the assembly is symmetrical therefore the left hand side (not shown) will be a mirror image of the right hand side illustrated in FIGS. 2-11. For example, the axis of translation 122 shown in each of the Figures may be considered an axis of symmetry about which the assembly is considered symmetrical. In addition, it is noted that some aspects such as the frame and actuating surface are omitted from FIGS. 2-11 for ease of illustration. The omitted aspects should, however, be understood as being included in the complete assembly for FIGS. 2-11 as previously discussed in reference to FIG. 1.

Figure 2:
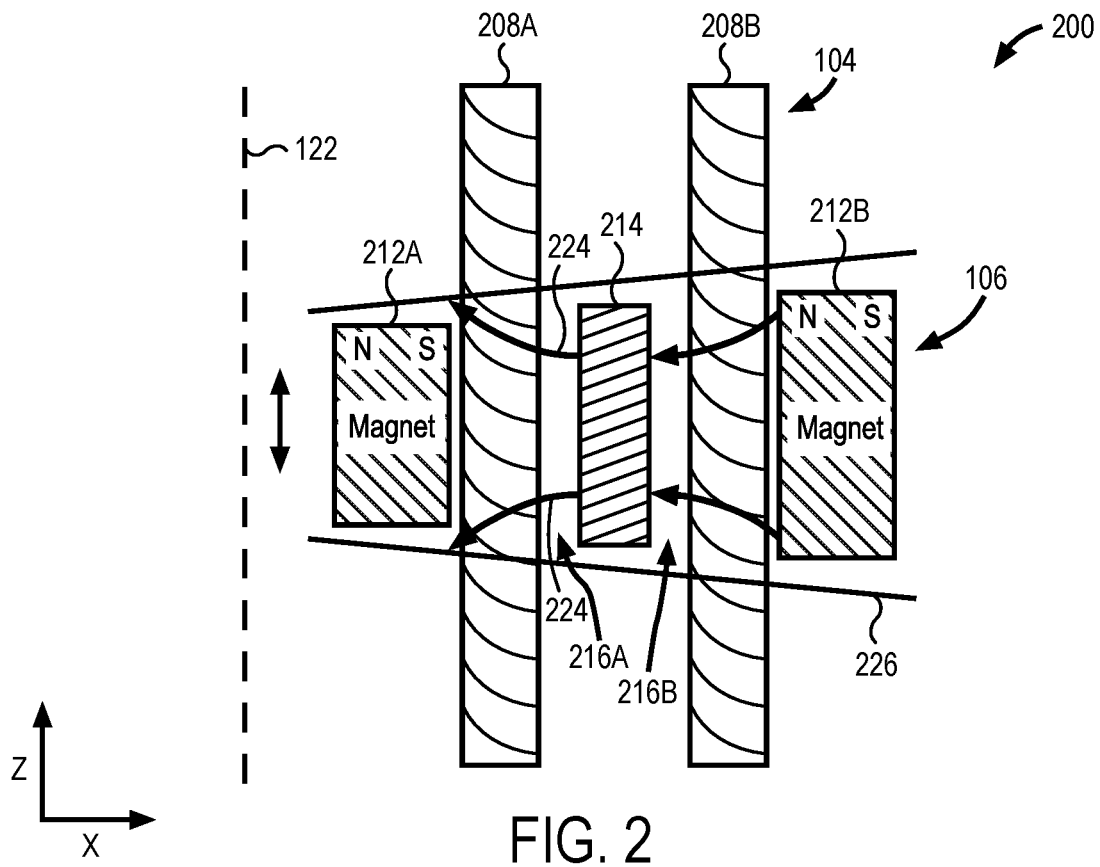
FIG. 2 illustrates a schematic cross-sectional side view of another aspect of a moving magnet motor assembly.

Referring now to FIG. 2, FIG. 2 illustrates assembly 200 having a stationary portion 104 including a pair of coils 208A, 208B and a moving portion 106 including a pair of first magnet members 212A, 212B and a second magnet member 214. As previously discussed, the moving portion 106 (e.g., first magnet members 212A-B and second magnet member 214) moves relative to the stationary portion 104 (e.g., coils 208A-B). In particular, each of the first magnet members 212A-B and second magnet member 214 translate together along the axis of translation 122 relative to coils 208A-B as illustrated by the arrow. The first magnet members 212A-B may both be radially polarized magnets which are oriented with their poles in the same direction as shown. The second magnet member 214 may be a flux concentrating member (e.g., a soft magnetic material such as steel) that concentrates the magnetic flux lines 224 generated by the first magnet members 212A-B within a region of concentrated or focused flux density 226. In this aspect, as the first magnet members 212A-B and second magnet member 214 translate together along coils 208A-B, which are positioned within the gaps 216A, 216B formed by the magnet members, the region of focused flux density 226 also travels along the winding height of coils 208A-B. As a result, a dominant flux density region can be maintained along the entire height of the coils 208A-B. This, in turn, enables larger excursions of the actuating surface (e.g., actuating surface 118) connected to the moving portion 106 without observing reverse magnetic field disturbance.

Referring now in more detail to the pair of coils 208A-B, coils 208A-B may in some aspects be separate voice coils that each have a winding height running parallel to the z-axis, or in a z-height direction as shown. Depending on the requirements from, for example the associated loudspeaker, coils 208A-B can be in series or parallel with a same direction of current so they are constructive. Both of coils 208A-B should have the same orientation (e.g., both coils into the plane, or both coils out of the plane). Coils 208A-B may have the same winding height as shown, which in some cases may be greater than a height of the magnet members of the moving portion 106 and gaps 216A-B as shown. In other aspects, coils 208A-B may have different winding heights. Each of coils 208A-B may, however, be considered continuous coils in that they have one continuous and uninterrupted winding height, in some cases formed by a single copper wire. In other words, coils 208A-B are not formed by coil sections or segments stacked one on top of the other to achieve the desired overall height shown in the Figures. In addition, as previously discussed, in some aspects, coils 208A-B are annularly shaped coils therefore coil 208A may be considered an inner coil and coil 208B may be considered an outer coil. Said another way coil 208A may be considered radially inward to coil 208B, or coil 208B may be considered radially outward to coil 208A.

Similarly, the magnet members 212A-B and 214 of the moving portion 106 may be annularly shaped members (e.g., circular, elliptical, race track like shape or the like). In this aspect, first magnet members 212A-B may be considered inner and outer magnet members, respectively, and second magnet member 214 may be a middle magnet member between the inner and outer magnet members 212A-B. Still further, the coil gap 216A may be considered an inner gap formed between inner magnet member 212A and middle magnet member 214, and coil gap 216B may be considered an outer gap formed between middle magnet member 214 and outer magnet member 212B.

As previously discussed, both first magnet members 212A and 212B may be radially polarized magnets and second magnet member 214 may be a flux concentrating member, for example, a steel structure. Each of the first magnet members 212A-B and second magnet member 214 may have a same height (dimension along the z-axis), or may have different heights. For example, in another aspect, each of first magnet members 212A-B and second magnet member 214 may have different heights that decrease toward the axis of translation 222 (which corresponds to the axis of symmetry). Regardless of the heights of the first and second magnet members 212A-B, 214, they may be considered to have a relatively large displacement range along the axis of translation that is equal to or less than the winding height of the coils 208A-B. In particular, the positive magnetic field is focused over a certain area of the magnet assembly such that when it moves along the coils 208A-B, it is not impacted by the reverse magnetic field (which is weaker than the focused positive magnetic field), and therefore the overall sum of magnetic field is not impacted, and hence the force from the circuitry not impacted. Thus, since the moving portion 106 carries the positive magnetic field along the entire height of the coils 208A-B, which over powers the reverse magnetic field, a positive force occurs along the entire height of the coil thus allowing for an improved displacement range. This is in comparison to open circuit systems without a focused magnetic flux region and which do not move along the coil and therefore they may lose force along certain regions of the coil.

Figure 3:
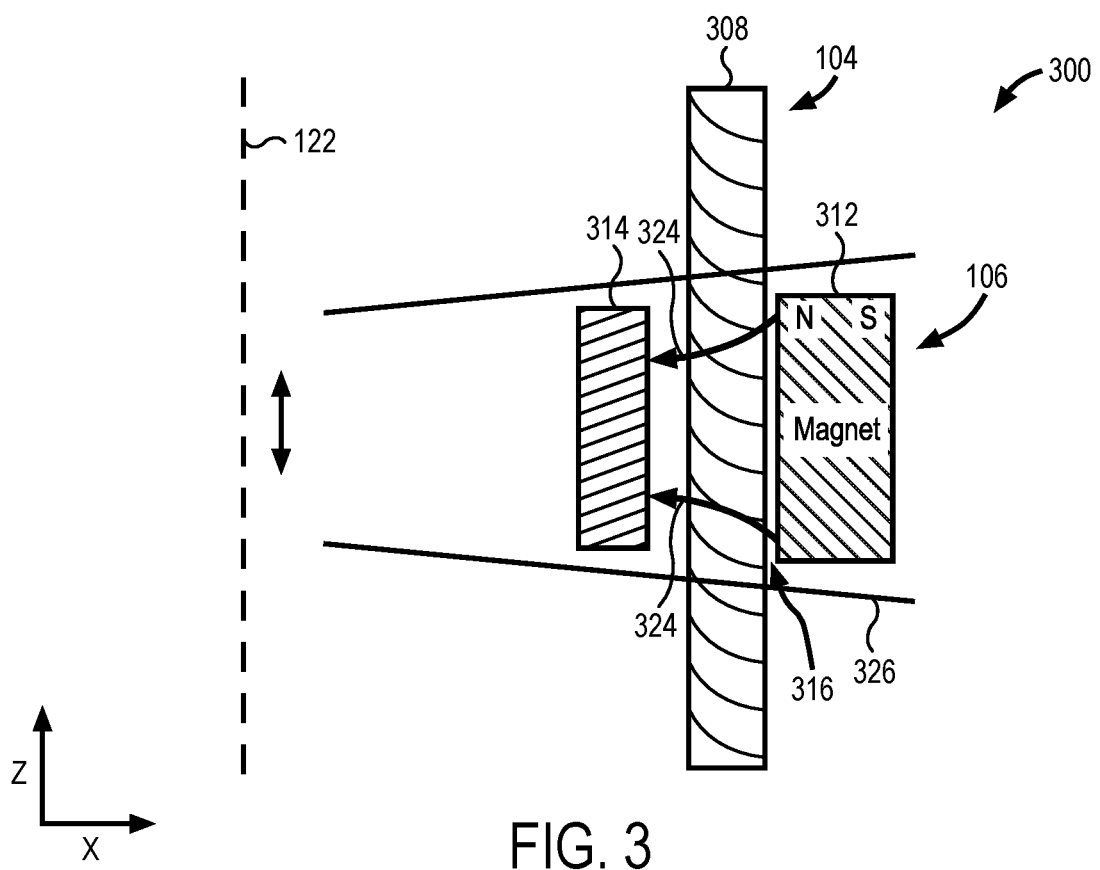
FIG. 3 illustrates a schematic cross-sectional side view of another aspect of a moving magnet motor assembly.

Referring now to FIG. 3, FIG. 3 illustrates assembly 300, which is similar to the previously discussed assemblies in that it includes a stationary portion 104 and a moving portion 106 that moves relative to the stationary portion 104 along the axis of translation 122. In assembly 300, however, the stationary portion 104 includes a single coil 308, and the moving portion 106 includes a single first magnet member 312 and single second magnet member 314 that are connected together and move relative to coil 308. The first magnet member 312 may be a radially polarized magnet positioned radially outward of the coil 308. The second magnet member 314 may be a flux concentrating member, for example a steel structure, positioned radially inward of the coil 308. As previously discussed, second magnet member 314 concentrates the magnetic flux lines 324 generated by the first magnet member 312 within a region of concentrated or focused flux density 326. In this aspect, as the first magnet member 312 and second magnet member 314 translate together along coil 308, which is positioned within the gaps 316 formed by the magnet members, the region of focused flux density 326 also travels along the winding height of coil 308. As a result, as previously discussed, a dominant flux density region can be maintained along the entire height of the coil 308, and in turn, larger excursions of the actuating surface (e.g., actuating surface 118) connected to the moving portion 106 can be achieved.

Figure 4:
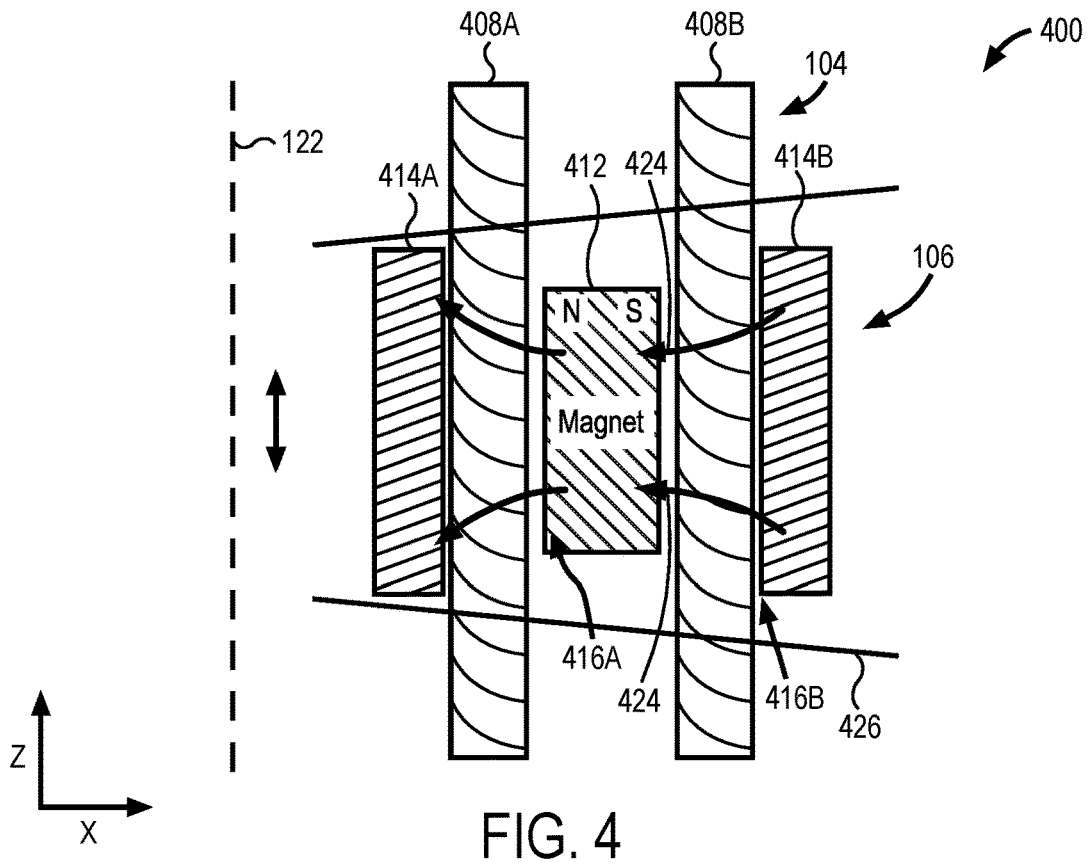
FIG. 4 illustrates a schematic cross-sectional side view of another aspect of a moving magnet motor assembly.

Referring now to FIG. 4, FIG. 4 illustrates assembly 400, which is similar to the previously discussed assemblies in that it includes a stationary portion 104 and a moving portion 106 that moves relative to the stationary portion 104 along the axis of translation 122. In assembly 400, however, the stationary portion 104 includes a pair of coils 408A and 408B, and the moving portion 106 includes a single first magnet member 412 and a pair of second magnet members 414A and 414B that are connected together (and to an actuating surface) and move relative to coils 408A-B. The first magnet member 412 may be a radially polarized magnet positioned between the pair of coils 408A-B. The pair of second magnet members 414A-B may flux concentrating members, for example steel structures, positioned on opposite sides of the coils 408A-B, for example, radially inward of the coil 408A and radially outward of the coil 408B. As previously discussed, second magnet members 414A-B concentrate the magnetic flux lines 424 generated by the first magnet member 412 within a region of concentrated or focused flux density 426. In this aspect, as the first magnet member 412 and second magnet members 414A-B translate together along coils 408A-B, which is positioned within the gaps 416A, 416B formed by the magnet members, the region of focused flux density 426 also travels along the winding height of coils 408A-B. As a result, as previously discussed, a dominant flux density region can be maintained along the entire height of the coils 408A-B, and in turn, larger excursions of the actuating surface (e.g., actuating surface 118) connected to the moving portion 106 can be achieved.

Figure 5:
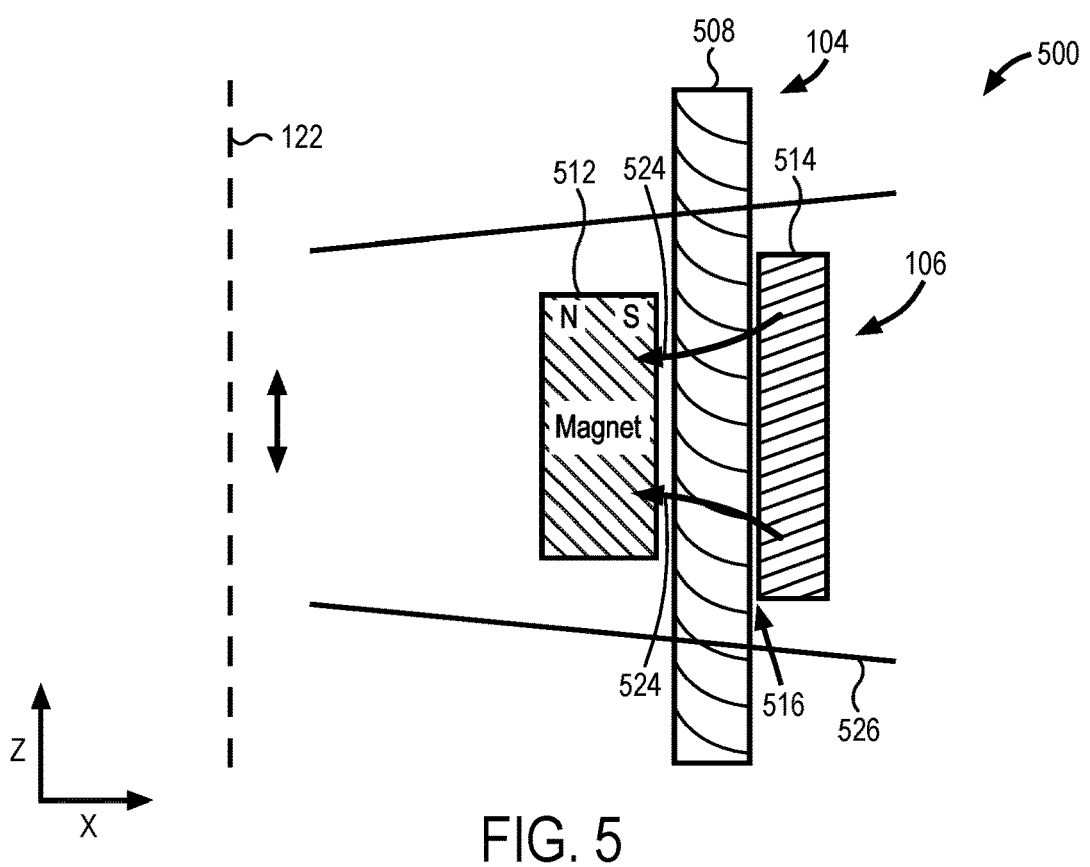
FIG. 5 illustrates a schematic cross-sectional side view of another aspect of a moving magnet motor assembly.

Referring now to FIG. 5, FIG. 5 illustrates assembly 500, which is similar to the previously discussed assemblies in that it includes a stationary portion 104 and a moving portion 106 that moves relative to the stationary portion 104 along the axis of translation 122. In assembly 500, however, the stationary portion 104 includes a single coil 508, and the moving portion 106 includes a single first magnet member 512 and a single second magnet members 514 that are connected together (and to an actuating surface) and move relative to coil 508. The first magnet member 512 may be a radially polarized magnet positioned radially inward of coil 508. The second magnet member 514 may a flux concentrating member, for example a steel structure, positioned radially outward of coil 508. As previously discussed, second magnet member 514 concentrates the magnetic flux lines 524 generated by the first magnet member 512 within a region of concentrated or focused flux density 526. In this aspect, as the first magnet member 512 and second magnet member 514 translate together along coil 508, which is positioned within the gap 516 formed by the magnet members, the region of focused flux density 526 also travels along the winding height of coil 508. As a result, as previously discussed, a dominant flux density region can be maintained along the entire height of the coil 508, and in turn, larger excursions of the actuating surface (e.g., actuating surface 118) connected to the moving portion 106 can be achieved.

Figure 6:
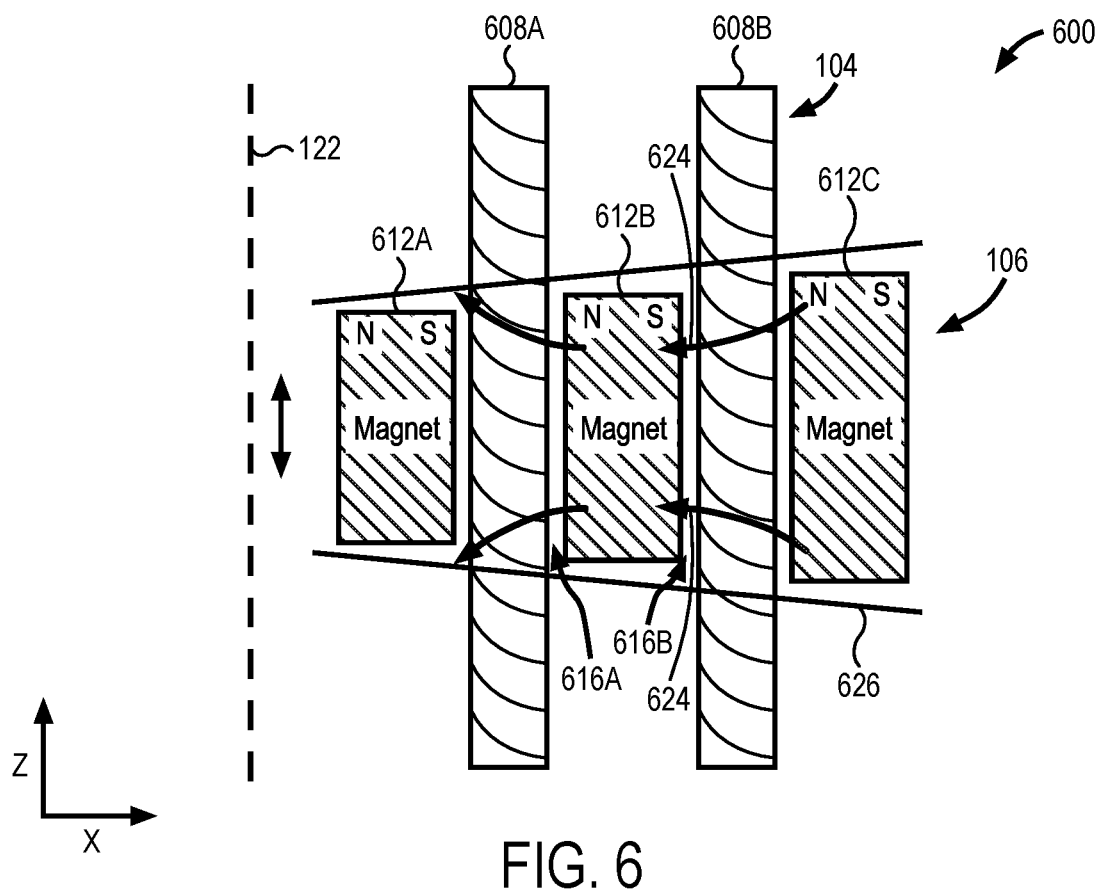
FIG. 6 illustrates a schematic cross-sectional side view of another aspect of a moving magnet motor assembly.

Referring now to FIG. 6, FIG. 6 illustrates assembly 600, which is similar to the previously discussed assemblies in that it includes a stationary portion 104 and a moving portion 106 that moves relative to the stationary portion 104 along the axis of translation 122. In assembly 600, however, the stationary portion 104 includes a pair of coils 608A and 608B, and the moving portion 106 includes three first magnet members 612A, 612B and 612C that are attached together (and an actuating surface) and move relative to coils 608A, 608B. The first magnet members 612A-C may be radially polarized magnets positioned in a same direction (e.g., North and south poles facing the same direction) between and outside of the pair of coils 608A-B. In this aspect, the first magnet members 612A-C act as flux concentrating members for each other and concentrate the magnetic flux lines 624 generated by the first magnet member 612 within a region of concentrated or focused flux density 626. In this aspect, as the first magnet members 612A-C translate together along coils 608A-B, which are positioned within the gaps 616A, 616B formed by the magnet members, the region of focused flux density 626 also travels along the winding height of coils 608A-B. As a result, as previously discussed, a dominant flux density region can be maintained along the entire height of the coils 608A-B, and in turn, larger excursions of the actuating surface (e.g., actuating surface 118) connected to the moving portion 106 can be achieved.

Figure 7:
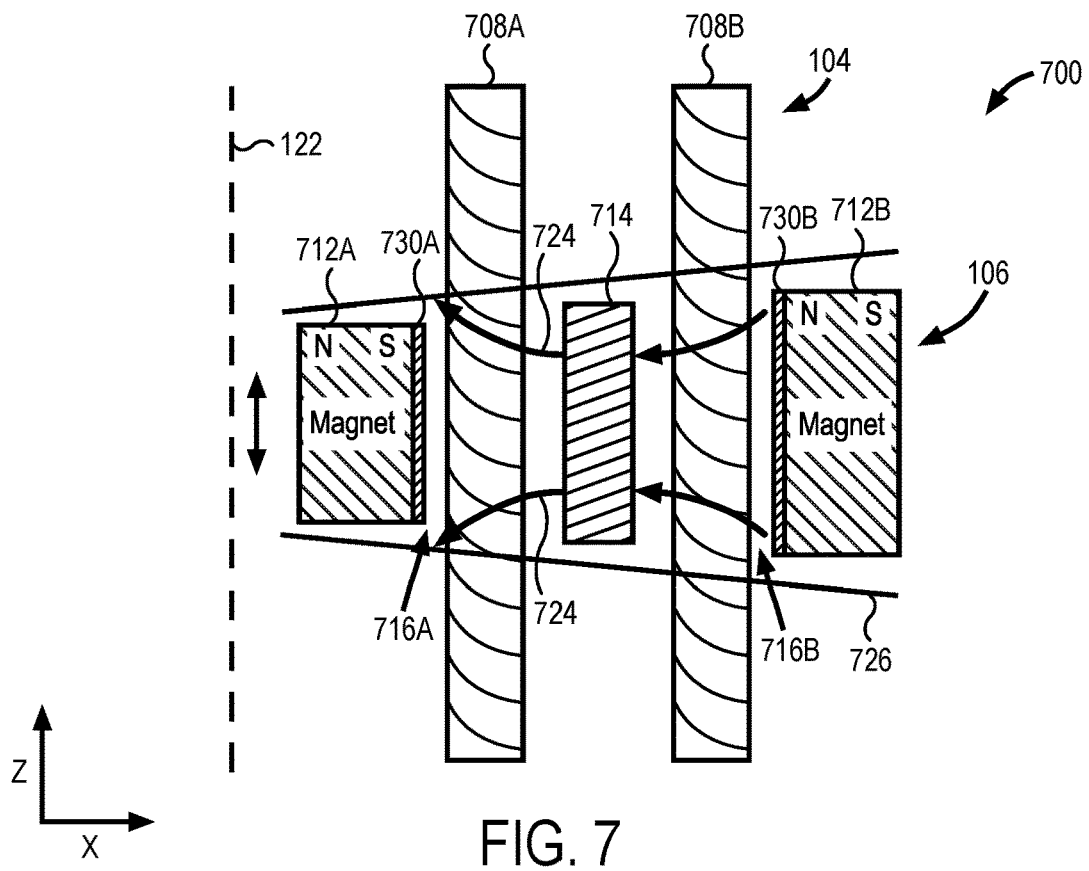
FIG. 7 illustrates a schematic cross-sectional side view of another aspect of a moving magnet motor assembly.

Referring now to FIG. 7, FIG. 7 illustrates assembly 700, which is similar to the previously discussed assemblies in that it includes a stationary portion 104 and a moving portion 106 that moves relative to the stationary portion 104 along the axis of translation 122. In assembly 700, however, the stationary portion 104 includes a pair of coils 708A and 708B, and the moving portion 106 includes a pair of first magnet members 712A, 712B, a single second magnet member 714 and a pair of third magnet members 730A, 730B coupled to the first magnet members 712A-B that are connected together (and to an actuating surface) and all move relative to coils 708A, 708B. The first magnet members 712A-B may be radially polarized magnets positioned radially outward of the pair of coils 708A-B, and the second magnet member 714 is positioned between coils 708A-B. The second magnet member 714 may be a flux concentrating member (e.g., a steel structure) that concentrate the magnetic flux lines 724 generated by the first magnet member 712A-B within a region of concentrated or focused flux density 726. The third magnet members 730A-B may be flux concentrating members that are directly attached to the surfaces of the first magnet members 712A-B facing the coils 708A-B. Representatively, third magnet members 730A-B may be a soft magnetic material similar to the second magnet member 714, for example, a steel material, that is attached to the surfaces of the first magnet members 712A-B. For example, third magnet member 730A may be attached to an outer surface of the first magnet member 712A that faces coil 708A, and third magnet member 730B may be attached to an inner surface of the first magnet member 712B that faces coil 708B. In this aspect, as the first magnet members 712A-B with third magnet members 730A-B attached and second magnet member 714 translate together along coils 708A-B, which are positioned within the gaps 716A, 716B formed by the magnet members, the region of focused flux density 726 also travels along the winding height of coils 708A-B. As a result, as previously discussed, a dominant flux density region can be maintained along the entire height of the coils 708A-B, and in turn, larger excursions of the actuating surface (e.g., actuating surface 118) connected to the moving portion 106 can be achieved.

Figure 8:
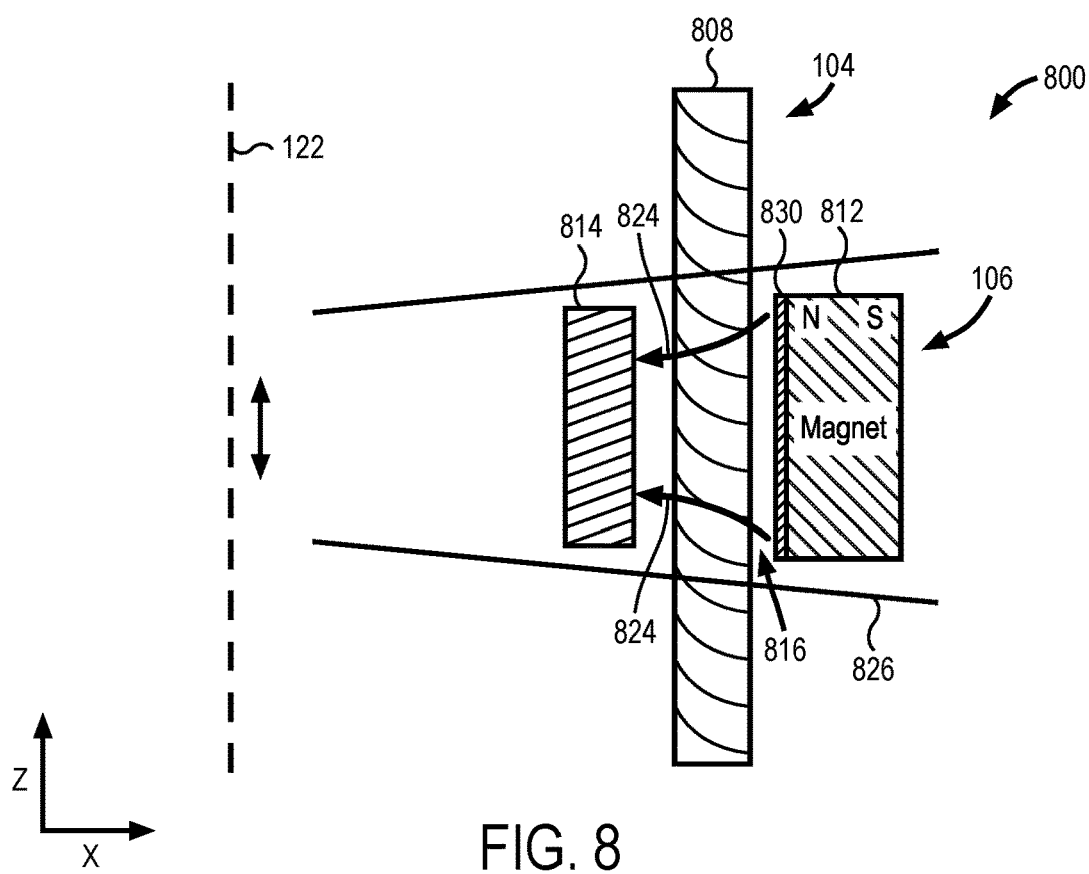
FIG. 8 illustrates a schematic cross-sectional side view of another aspect of a moving magnet motor assembly.

Referring now to FIG. 8, FIG. 8 illustrates assembly 800, which is similar to the previously discussed assemblies in that it includes a stationary portion 104 and a moving portion 106 that moves relative to the stationary portion 104 along the axis of translation 122. In assembly 800, however, the stationary portion 104 includes a single coil 808, and the moving portion 106 includes a single first magnet member 812, a single second magnet member 814 and a third magnet member 830 coupled to the first magnet members 812 that are connected to one another (and an actuating surface) and all move relative to coil 808. The first magnet member 812 may be a radially polarized magnet positioned radially outward of the coil 808, and the second magnet member 814 is positioned radially inward of the coil 808. The second magnet member 814 may be a flux concentrating member (e.g., a steel structure) that concentrates the magnetic flux lines 824 generated by the first magnet member 812 within a region of concentrated or focused flux density 826. The third magnet member 830 may be a flux concentrating member that is directly attached to the surface of the first magnet member 812 facing the coil 808. Representatively, third magnet member 830 may be a soft magnetic material similar to the second magnet member 814, for example, a steel material, that is attached to the surface of the first magnet members 812. For example, third magnet member 730 may be attached to an inner surface of the first magnet member 812 that faces coil 808. In this aspect, as the first magnet member 812 with third magnet member 830 attached and second magnet member 814 translate together along coil 808, which is positioned within the gap 816 formed by the magnet members, the region of focused flux density 826 also travels along the winding height of coil 808. As a result, as previously discussed, a dominant flux density region can be maintained along the entire height of the coil 808, and in turn, larger excursions of the actuating surface (e.g., actuating surface 118) connected to the moving portion 106 can be achieved.

Figure 9:
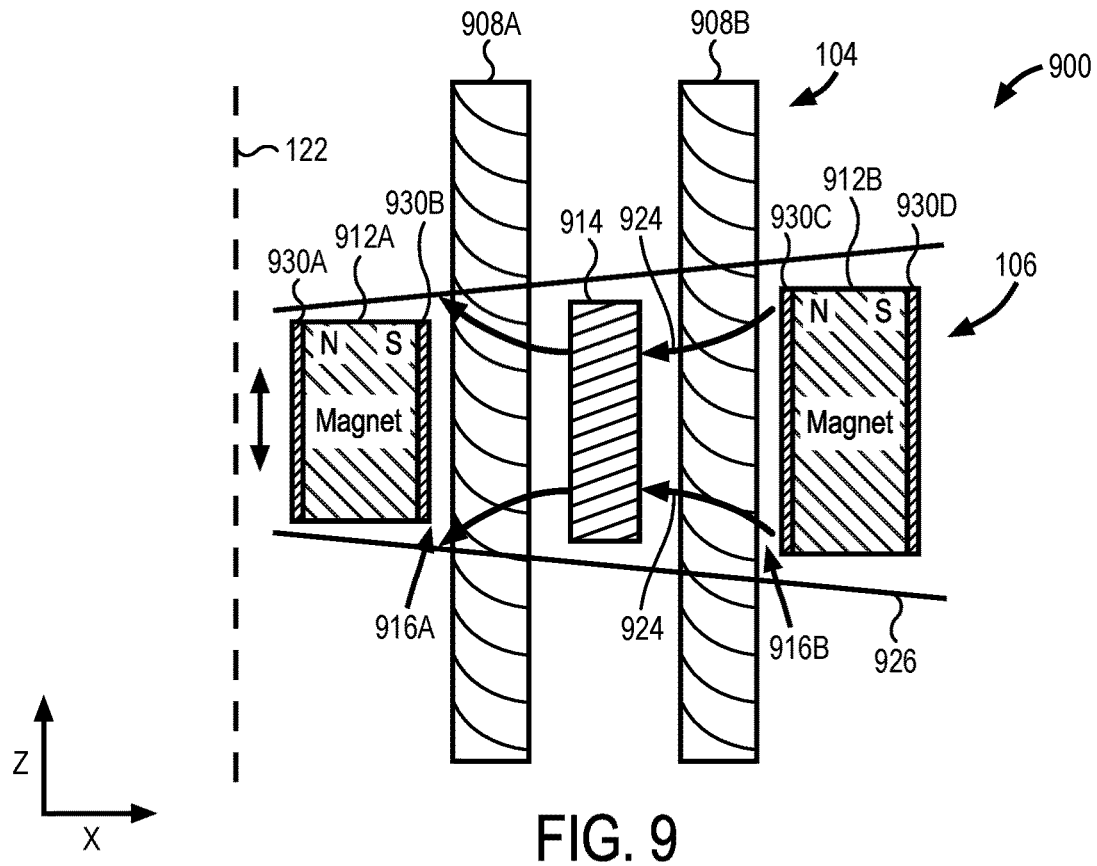
FIG. 9 illustrates a schematic cross-sectional side view of another aspect of a moving magnet motor assembly.

Referring now to FIG. 9, FIG. 9 illustrates assembly 900, which is similar to the previously discussed assemblies in that it includes a stationary portion 104 and a moving portion 106 that moves relative to the stationary portion 104 along the axis of translation 122. In assembly 900, however, the stationary portion 104 includes a pair of coils 908A and 908B, and the moving portion 106 includes a pair of first magnet members 912A, 912B, a single second magnet member 914 and four third magnet members 930A, 930B, 930C and 930D coupled to each of the inner and outer surfaces of the first magnet members 912A-B that all move relative to coils 908A, 908B. The first magnet members 912A-B may be radially polarized magnets positioned radially outward and inward of the pair of coils 908A-B as shown, and the second magnet member 914 is positioned between coils 908A-B. The second magnet member 914 may be a flux concentrating member (e.g., a steel structure) that concentrate the magnetic flux lines 924 generated by the first magnet members 912A-B within a region of concentrated or focused flux density 926. The third magnet members 930A-D may be flux concentrating members that are directly attached to the surfaces of the first magnet members 912A-B. Representatively, third magnet members 930A-D may be a soft magnetic material similar to the second magnet member 914, for example, a steel material, that is attached to the surfaces of the first magnet members 912A-B. For example, third magnet member 930A may be attached to an inner surface of the first magnet member 912A that faces a center of the assembly, third magnet member 912B may be attached to an outer surface of the first magnet member 912A that faces coil 908A, third magnet member 930C may be attached to an inner surface of the first magnet member 912B that faces coil 908B and third magnet member 930D may be attached to an outer surface of first magnet member 912B facing away from coil 908B. In this aspect, as the first magnet members 912A-B with third magnet members 930A-D attached and second magnet member 914 translate together along coils 908A-B, which are positioned within the gaps 916A, 916B formed by the magnet members, the region of focused flux density 926 also travels along the winding height of coils 908A-B. As a result, as previously discussed, a dominant flux density region can be maintained along the entire height of the coils 908A-B, and in turn, larger excursions of the actuating surface (e.g., actuating surface 118) connected to the moving portion 106 can be achieved.

Figure 10:
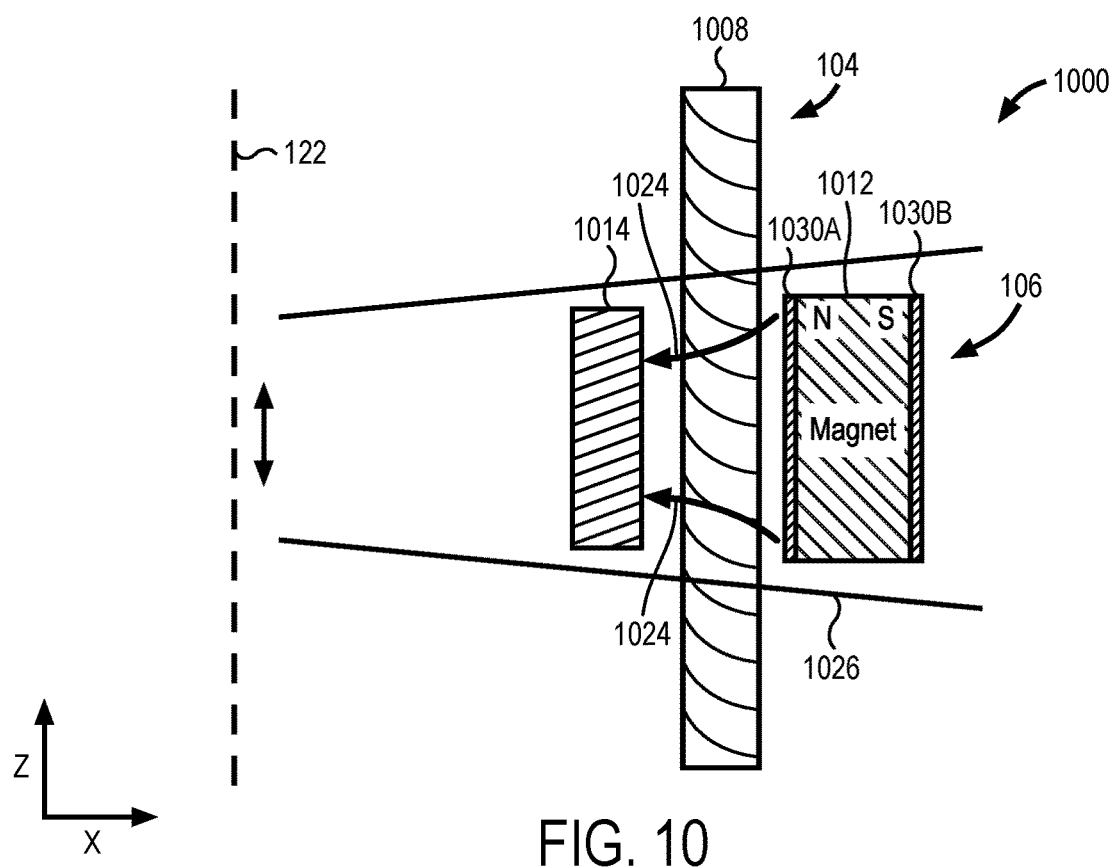
FIG. 10 illustrates a schematic cross-sectional side view of another aspect of a moving magnet motor assembly.

Referring now to FIG. 10, FIG. 10 illustrates assembly 1000, which is similar to the previously discussed assemblies in that it includes a stationary portion 104 and a moving portion 106 that moves relative to the stationary portion 104 along the axis of translation 122. In assembly 1000, however, the stationary portion 104 includes a single coil 1008, and the moving portion 106 includes a single first magnet member 1012, a single second magnet member 1014 and a pair of third magnet members 1030A, 1030B coupled to the first magnet member 1012 that are attached to each other (and an actuating surface) and all move relative to coil 1008. The first magnet member 1012 may be a radially polarized magnet positioned radially outward of the coil 1008, and the second magnet member 1014 is positioned radially inward of the coil 1008. The second magnet member 1014 may be a flux concentrating member (e.g., a steel structure) that concentrates the magnetic flux lines 1024 generated by the first magnet member 1012 within a region of concentrated or focused flux density 1026. The third magnet members 1030A-B may be flux concentrating members that are directly attached to the inner and outer surfaces of the first magnet member 1012. Representatively, third magnet member 1030A-B may be soft magnetic materials similar to the second magnet member 1014, for example, a steel material, that are attached to the surfaces of the first magnet members 1012. For example, third magnet member 1030A may be attached to an inner surface of the first magnet member 1012 that faces coil 1008 and third magnet member 1030B may be attached to an outer surface of first magnet member 1012 facing away from coil 1008. In this aspect, as the first magnet member 1012 with third magnet members 1030A-B attached and second magnet member 1014 translate together along coil 1008, which is positioned within the gap 1016 formed by the magnet members, the region of focused flux density 1026 also travels along the winding height of coil 1008. As a result, as previously discussed, a dominant flux density region can be maintained along the entire height of the coil 1008, and in turn, larger excursions of the actuating surface (e.g., actuating surface 118) connected to the moving portion 106 can be achieved.

Figure 11:
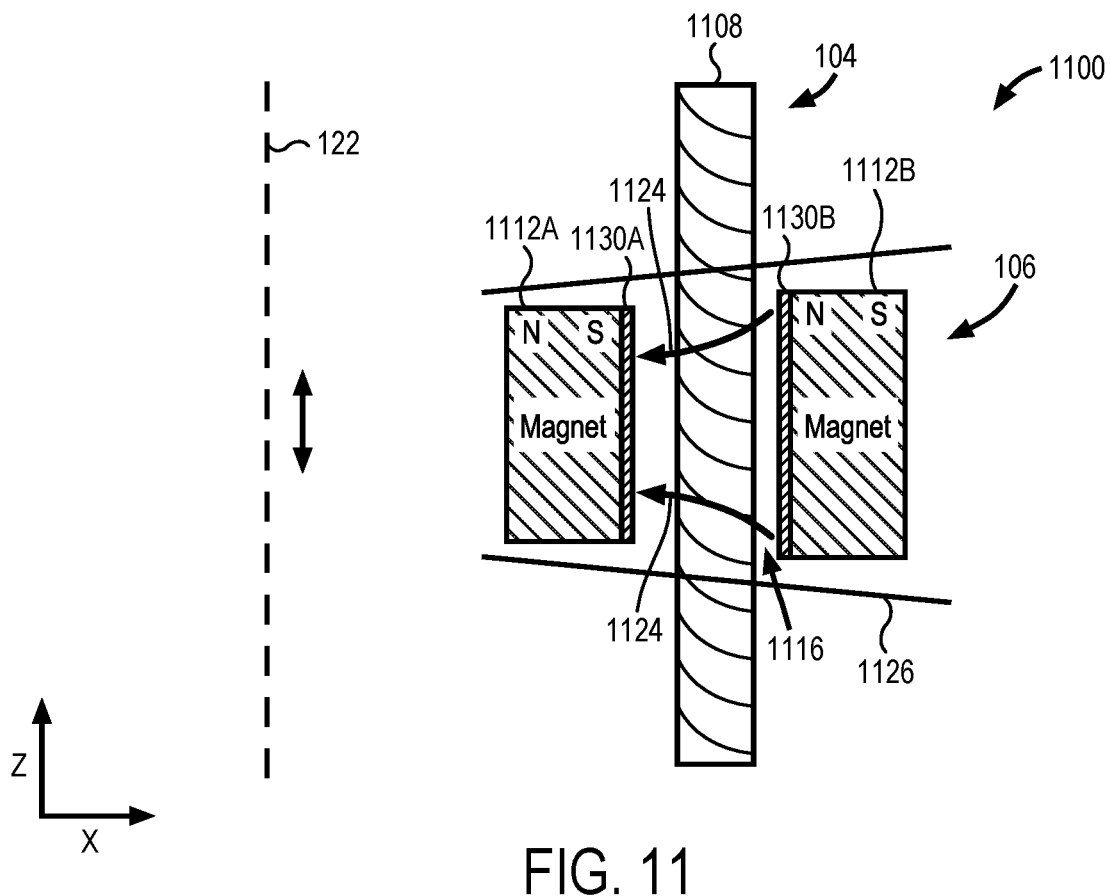
FIG. 11 illustrates a schematic cross-sectional side view of another aspect of a moving magnet motor assembly.

Referring now to FIG. 11, FIG. 11 illustrates assembly 1100, which is similar to the previously discussed assemblies in that it includes a stationary portion 104 and a moving portion 106 that moves relative to the stationary portion 104 along the axis of translation 122. In assembly 1100, however, the stationary portion 104 includes a single coil 1108, and the moving portion 106 includes a pair of first magnet members 1112A, 112B and a pair of third magnet member 1130A, 1130B coupled to the first magnet members 1112A-B that all move relative to coil 1108. The moving portion 106 in this aspect therefore omits the previously discussed second magnet member (e.g., magnet member 1014). The first magnet member 1112A may be a radially polarized magnet positioned radially inward of the coil 1108 and the first magnet member 1112B is positioned radially outward of the coil 1108. The third magnet members 1130A-B may be flux concentrating members (e.g., a steel structure) attached to surfaces of the first magnet members 1112A-B facing coil 1108. The third magnet members 1130A-B may be flux concentrating members that concentrate the magnetic flux lines 1124 generated by the first magnet member 1112A-B within a region of concentrated or focused flux density 1126. The third magnet members 1130A-B may be directly attached to the surfaces of the first magnet members 1112A-B facing the coil 1108. Representatively, third magnet member 1130A may be a soft magnetic material such as a steel material that is attached to the outer surface of the first magnet member 1112A and third magnet member 1130B may be a soft magnetic material such as a steel material attached to the inner surface of the first magnet member 1112B. In this aspect, as the first magnet members 1112A-B with third magnet members 1130A-B attached translate together along coil 1108, which is positioned within the gap 1116 formed by the magnet members, the region of focused flux density 1126 also travels along the winding height of coil 1108. As a result, as previously discussed, a dominant flux density region can be maintained along the entire height of the coil 1108, and in turn, larger excursions of the actuating surface (e.g., actuating surface 118) connected to the moving portion 106 can be achieved.

Figure 12:
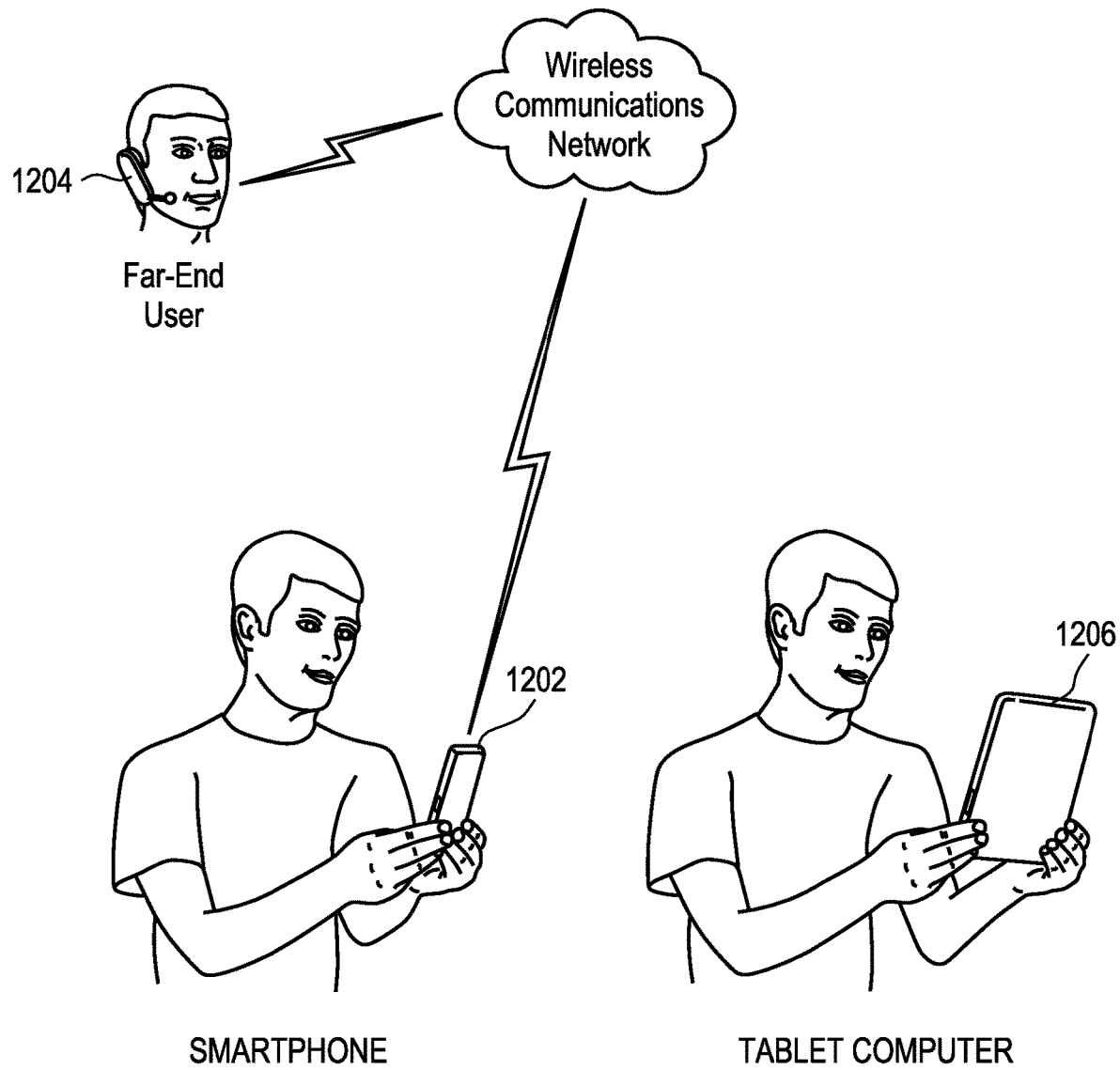
FIG. 12 illustrates a simplified schematic view of an electronic device in which a transducer assembly may be implemented.

FIG. 12 illustrates a simplified schematic perspective view of an exemplary electronic device in which a transducer assembly as described herein, may be implemented. As illustrated in FIG. 12, the transducer assembly may be integrated within a consumer electronic device 1202 such as a smart phone with which a user can conduct a call with a far-end user of a communications device 1204 over a wireless communications network; in another example, the transducer assembly may be integrated within the housing of a tablet computer 1206. These are just two examples of where the transducer assembly described herein may be used; it is contemplated, however, that the transducer assembly may be used with any type of electronic device, for example, a home audio system, any consumer electronics device with audio capability, or an audio system in a vehicle (e.g., an automobile infotainment system).

Figure 13:
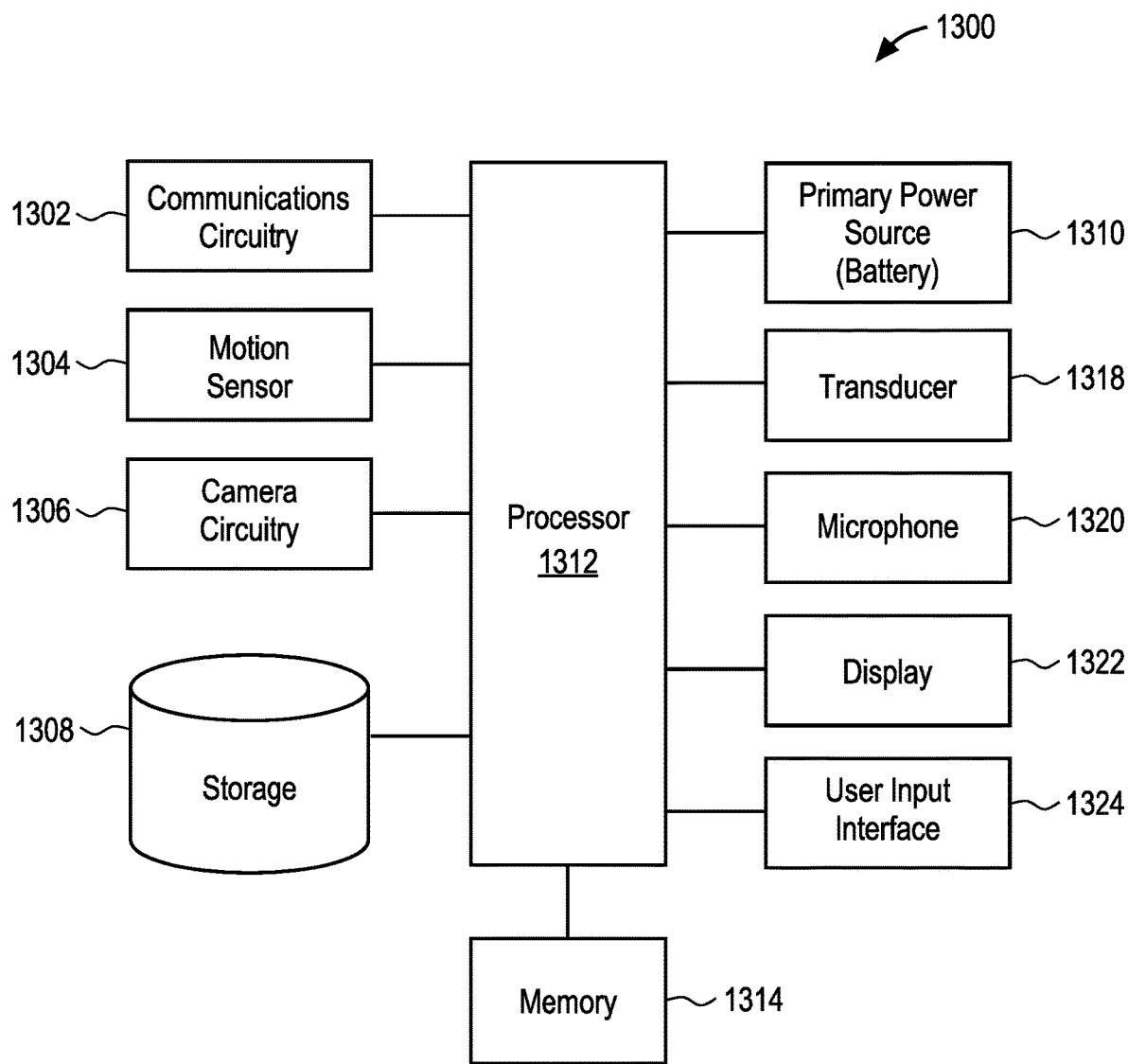
FIG. 13 illustrates a block diagram of some of the constituent components of an electronic device in which a transducer assembly may be implemented.

FIG. 13 illustrates a block diagram of some of the constituent components of an electronic device in which the transducer assembly disclosed herein may be implemented. Device 1300 may be any one of several different types of consumer electronic devices, for example, any of those discussed in reference to FIG. 12.

In this aspect, electronic device 1300 includes a processor 1312 that interacts with camera circuitry 1306, motion sensor 1304, storage 1308, memory 1314, display 1322, and user input interface 1324. Main processor 1312 may also interact with communications circuitry 1302, primary power source 1310, transducer 1318 and microphone 1320. Transducer 1318 may be a speaker and/or the transducer assembly described herein. The various components of the electronic device 1300 may be digitally interconnected and used or managed by a software stack being executed by the processor 1312. Many of the components shown or described here may be implemented as one or more dedicated hardware units and/or a programmed processor (software being executed by a processor, e.g., the processor 1312).

The processor 1312 controls the overall operation of the device 1300 by performing some or all of the operations of one or more applications or operating system programs implemented on the device 1300, by executing instructions for it (software code and data) that may be found in the storage 1308. The processor 1312 may, for example, drive the display 1322 and receive user inputs through the user input interface 1324 (which may be integrated with the display 1322 as part of a single, touch sensitive display panel). In addition, processor 1312 may send a current or signal (e.g., audio signal) to transducer 1318 to facilitate operation of transducer 1318. Representatively, the processor 1312 may send a current or signal to one or more components of a transducer assembly (e.g., assemblies 100-1100) to drive the components independently or together. For example, the coils 108-1108 could be driven independently by different channels on the amplifier, or together by the same channel, depending on the application needs.

Storage 1308 provides a relatively large amount of "permanent" data storage, using nonvolatile solid state memory (e.g., flash storage) and/or a kinetic nonvolatile storage device (e.g., rotating magnetic disk drive). Storage 1308 may include both local storage and storage space on a remote server. Storage 1308 may store data as well as software components that control and manage, at a higher level, the different functions of the device 1300.

In addition to storage 1308, there may be memory 1314, also referred to as main memory or program memory, which provides relatively fast access to stored code and data that is being executed by the processor 1312. Memory 1314 may include solid state random access memory (RAM), e.g., static RAM or dynamic RAM. There may be one or more processors, e.g., processor 1312, that run or execute various software programs, modules, or sets of instructions (e.g., applications) that, while stored permanently in the storage 1308, have been transferred to the memory 1314 for execution, to perform the various functions described above.

The device 1300 may include communications circuitry 1302. Communications circuitry 1302 may include components used for wired or wireless communications, such as two-way conversations and data transfers. For example, communications circuitry 1302 may include RF communications circuitry that is coupled to an antenna, so that the user of the device 1300 can place or receive a call through a wireless communications network. The RF communications circuitry may include a RF transceiver and a cellular baseband processor to enable the call through a cellular network. For example, communications circuitry 1302 may include Wi-Fi communications circuitry so that the user of the device 1300 may place or initiate a call using voice over Internet Protocol (VOIP) connection, transfer data through a wireless local area network.

The device may include a transducer 1318. Transducer 1318 may be a speaker and/or a transducer assembly such as that described in reference to FIGS. 1-12. Transducer 1318 may be an electric-to-acoustic transducer or sensor that converts an electrical signal input (e.g., an acoustic input) into a sound or vibration output. The circuitry of the speaker may be electrically connected to processor 1312 and power source 1310 to facilitate the speaker operations as previously discussed (e.g, diaphragm displacement, etc).

The device 1300 may further include a motion sensor 1304, also referred to as an inertial sensor, that may be used to detect movement of the device 1300, camera circuitry 1306 that implements the digital camera functionality of the device 1300, and primary power source 1310, such as a built in battery, as a primary power supply.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A moving magnet motor comprising:
a frame;
a coil coupled to the frame and having a first end and a second end defining a winding height of the coil;
a magnet assembly operable to move relative to the coil and the frame, the magnet assembly comprising a magnet and a flux concentrating member that define a gap within which the coil is positioned and a dominant flux density region along an entire winding height of the coil; and
an actuating surface coupled to the magnet assembly, and wherein a movement of the magnet assembly drives a movement of the actuating surface.

2. The moving magnet motor of claim 1 wherein the coil is a continuous voice coil.

3. The moving magnet motor of claim 1 wherein the coil is an annularly shaped voice coil and the magnet is radially inward of the annularly shaped voice coil and the flux concentrating member is radially outward of the annularly shaped voice coil.

4. The moving magnet motor of claim 1 wherein the coil is an annularly shaped voice coil and the flux concentrating member is radially inward of the annularly shaped voice coil and the magnet is radially outward of the annularly shaped voice coil.

5. The moving magnet motor of claim 1 wherein the magnet is a radially polarized magnet.

6. The moving magnet motor of claim 1 wherein the flux concentrating member is a steel structure.

7. The moving magnet motor of claim 1 wherein the flux concentrating member is a radially polarized magnet.

8. The moving magnet motor of claim 1 wherein the flux concentrating member is a first flux concentrating member and the magnet assembly further comprises a second flux concentrating member that is directly coupled to the magnet.

9. The moving magnet motor of claim 1 wherein the coil is a first voice coil, the assembly moving magnet motor further comprises a second voice coil positioned radially outward of the first voice coil.

10. The moving magnet motor of claim 9 wherein the first voice coil and the second voice coil have a same direction of current and a same orientation.

11. The moving magnet motor of claim 9 wherein the flux concentrating member is positioned between the first voice coil and the second voice coil, and the magnet is a first radially polarized magnet, the magnet assembly further comprises a second radially polarized magnet, and wherein the first radially polarized magnet is positioned radially inward of the first voice coil and the second radially polarized magnet is positioned radially outward of the second voice coil.

12. The moving magnet motor of claim 9 wherein the magnet is positioned between the first voice coil and the second voice coil, the flux concentrating member is a first flux concentrating member, the magnet assembly further comprises a second flux concentrating member, and wherein the first flux concentrating member is positioned radially inward of the first voice coil and the second flux concentrating member is positioned radially outward of the second voice coil.

13. The moving magnet motor of claim 1 wherein the frame comprises an electronic device housing.

14. A loudspeaker moving magnet motor assembly comprising:
a continuous voice coil coupled to a frame;
a diaphragm positioned over the continuous voice coil and coupled to the frame; and
a magnet assembly coupled to the diaphragm, the magnet assembly having a first magnet member and a second magnet member that define a gap within which the continuous voice coil is positioned, and the first magnet member and the second magnet member are operable to focus a magnetic flux density toward the continuous voice coil and translate along the continuous voice coil to drive a movement of the diaphragm along an axis of translation.

15. The loudspeaker moving magnet motor assembly of claim 14 the magnet assembly has a displacement range along the axis of translation that is defined by a height of the continuous voice coil.

16. The loudspeaker moving magnet motor assembly of claim 14 wherein the first magnet member is a radially polarized magnet and the second magnet member is a steel member that are positioned on opposite sides of the continuous voice coil.

17. The loudspeaker moving magnet motor assembly of claim 14 further comprising a third magnet member.

18. The loudspeaker moving magnet motor assembly of claim 17 wherein the continuous voice coil is a first continuous voice coil, and the assembly further comprises a second continuous voice coil.

19. The loudspeaker moving magnet motor assembly of claim 18 wherein the second magnet member is a steel structure positioned between the first continuous voice coil and the second continuous voice coil, and wherein the first magnet member and the third magnet member are positioned along sides of the first continuous voice coil and the second continuous voice coil opposite the second magnet member.

20. The loudspeaker moving magnet motor assembly of claim 18 wherein the first magnet member, the second magnet member and the third magnet member are positioned along different sides of the first continuous voice coil and the second continuous voice coil, and at least one of the first magnet member, the second magnet member and the third magnet member comprises a radially polarized magnet.

* * * * *

UNITED STATES PATENT AND TRADEMARK OFFICE
CERTIFICATE OF CORRECTION

PATENT NO. : 12,096,196 B2  
APPLICATION NO. : 18/488802  
DATED : September 17, 2024  
INVENTOR(S) : Onur I. Ilkorur et al.

Page 1 of 1

It is certified that error appears in the above-identified patent and that said Letters Patent is hereby corrected as shown below:

In the Claims

Column 16,
Line 14, Claim 9, delete "assembly"

Signed and Sealed this
Tenth Day of December, 2024

Katherine Kelly Vidal
*Director of the United States Patent and Trademark Office*